US011866573B2

(12) United States Patent
Omata et al.

(10) Patent No.: US 11,866,573 B2
(45) Date of Patent: Jan. 9, 2024

(54) THERMOPLASTIC RESIN COMPOSITION AND MOLDED ARTICLE

(71) Applicant: Techno-UMG Co., Ltd., Minato-ku (JP)

(72) Inventors: Yuuki Omata, Minato-ku (JP); Shinsuke Fujioka, Minato-ku (JP)

(73) Assignee: Techno-UMG Co., Ltd., Minato-ku (JP)

(*) Notice: Subject to any disclaimer, the term of this patent is extended or adjusted under 35 U.S.C. 154(b) by 0 days.

(21) Appl. No.: 16/618,891

(22) PCT Filed: Jul. 17, 2018

(86) PCT No.: PCT/JP2018/026782
§ 371 (c)(1),
(2) Date: Dec. 3, 2019

(87) PCT Pub. No.: WO2019/021894
PCT Pub. Date: Jan. 31, 2019

(65) Prior Publication Data
US 2021/0087378 A1 Mar. 25, 2021

(30) Foreign Application Priority Data
Jul. 28, 2017 (JP) .................... 2017-147146

(51) Int. Cl.
C08L 25/12 (2006.01)
(52) U.S. Cl.
CPC .................. C08L 25/12 (2013.01)
(58) Field of Classification Search
CPC .............. C08L 25/12; C08L 2205/035; C08L 2205/025; C08L 2205/03; C08L 33/12; C08L 25/16; C08L 33/06; C08L 51/06
See application file for complete search history.

(56) References Cited

U.S. PATENT DOCUMENTS

| | | | |
|---|---|---|---|
| 6,849,689 B2 | 2/2005 | Yamada et al. | |
| 9,505,866 B2 | 11/2016 | Maeda et al. | |
| 2002/0188066 A1 | 12/2002 | Yamada et al. | |
| 2006/0148992 A1 | 7/2006 | Kim et al. | |
| 2013/0345362 A1 | 12/2013 | Maeda et al. | |
| 2018/0265690 A1* | 9/2018 | Kim | C08J 5/00 |

FOREIGN PATENT DOCUMENTS

| | | | | |
|---|---|---|---|---|
| EP | 2 865 714 A1 | 4/2015 | | |
| JP | 63-189455 A | 8/1988 | | |
| JP | 2000-302937 A | 10/2000 | | |
| JP | 2000302937 A * | 10/2000 | | |
| JP | 2003-335827 A | 11/2003 | | |
| JP | 2007-169384 A | 7/2007 | | |
| JP | 2007-231297 A | 9/2007 | | |
| JP | 2009-132776 A | 6/2009 | | |
| JP | 2012001713 A * | 1/2012 | ............ | C08F 265/04 |
| JP | 2012-214734 A | 11/2012 | | |
| JP | 2012-251015 A | 12/2012 | | |
| JP | 2016-180096 A | 10/2016 | | |
| KR | 10-2016-0061628 A | 6/2016 | | |
| KR | 10-2016-0072961 A | 6/2016 | | |
| WO | WO-2017095060 A1 * | 6/2017 | ............. | C08J 3/005 |

OTHER PUBLICATIONS

Machine Translation of JP 2009/132776 A (Year: 2009).*
Machine translation of JP 2000302937 (Year: 2000).*
Machine Translation of JP 2012/001713. Patent Translate (Year: 2012).*
International Search Report dated Oct. 23, 2018 in corresponding PCT Application No. PCT/JP2018/026782 filed on Jul. 17, 2018.
Extended European Search Report dated Mar. 17, 2021 in corresponding European Patent Application No. 18838080.2, 7 pages.
Japanese Office Action dated May 11, 2021 in Japanese Patent Application No. 2017-147746 (with unedited computer generated English translation), 6 pages.
Combined Chinese Office Action and Search Report dated Apr. 6, 2021 in Chinese Patent Application No. 201880030892.6 (with unedited computer generated English translation), 14 pages.
Decision of Refusal dated Aug. 17, 2021, in the corresponding Japanese application No. 2017-147146 (with machine English translation).
Office Action dated Nov. 10, 2021 , in Chinese Application (No. 201880030892.6) along with the English machine translation (14 pages).
Office Action dated Oct. 12, 2022, in corresponding European Patent Application No. 18838060.2.

* cited by examiner

*Primary Examiner* — Callie E Shosho
*Assistant Examiner* — Bethany M Miller
(74) *Attorney, Agent, or Firm* — Oblon, McClelland, Maier & Neustadt, L.L.P.

(57) ABSTRACT

The thermoplastic resin composition of the invention includes: 10% to 70% by mass of (A) a rubber-reinforced vinyl-based resin containing a rubbery part derived from an acrylic rubbery polymer and a resin pan having a structural unit derived from an aromatic vinyl compound and a structural unit derived from a cyanidated vinyl compound; 5% to 80% by mass of (B) a (meth)acrylic resin (excluding component (A)) including a (co)polymer which has a structural unit derived from an alkyl (meth)acrylate ester compound and which does not have a structural unit derived from α-methylstyrene; and 5% to 70% by mass of (C) an α-methylstyrene-based resin (excluding component (A)) containing a (co)polymer which has a structural unit derived from α-methylstyrene and which does not have a structural unit derived from an alkyl (meth)acrylate ester compound based on 100% by mass of a total content of components (A) to (C).

9 Claims, No Drawings

THERMOPLASTIC RESIN COMPOSITION AND MOLDED ARTICLE

TECHNICAL FIELD

The present invention relates to a thermoplastic resin composition suitable for the production of molded articles excellent in weatherability.

BACKGROUND ART

A molded article including a rubber-reinforced vinyl-based resin such as ABS resin, ASA resin, and AES resin is used in fields of vehicles, household electrical appliances, building materials, and the like because of its excellent impact resistance and the like. Among these, ASA resin is used widely for molded articles to be used outdoors and molded articles to be used indoors which are to be exposed to sunlight because it exhibits low degrees of deterioration in color tone and surface gloss, so that its appearance is maintained at high level.

Heretofore, molding materials which give a molded article excellent in weatherability are disclosed, for example, in the following Patent Literatures 1 to 3.

Patent Literature 1 discloses a rubber-reinforced thermoplastic resin characterized in that a copolymerized resin (A1) obtained by polymerizing a vinyl-based monomer (b1) in the presence of an acrylic rubbery polymer (a) composed of 50% to 98% by weight of an acrylic rubbery polymer particle (a1) having a particle diameter of smaller than 350 nm and 2% to 50% by weight of an acrylic rubbery polymer particle (a2) having a particle diameter of 350 nm or larger where a total of (a1) and (a2) is 100% by weight, or a mixture of the copolymerized resin (A1) and a (co)polymer (A2) of a vinyl-based monomer (b2) is comprised, and that the content of the acrylic rubbery polymer (a) is in a range from 5% to 80% by weight with respect to the whole resin.

Patent Literature 2 discloses a thermoplastic resin composition including an acrylic rubber-based graft copolymer that is a graft copolymer produced by graft-polymerizing a vinyl-based monomer in the presence of a rubbery polymer including an acrylic acid ester-based monomer unit and a polyfunctional monomer unit, in which the total amount of the polyfunctional monomer unit in the rubbery polymer is 0.3 to 3 parts by mass with respect to 100 parts by mass of the acrylic acid ester-based monomer unit, and 30% to 95% by mass of the polyfunctional monomer unit having two unsaturated bonds and 5% to 70% by mass of the polyfunctional monomer unit having three unsaturated bonds are contained in 100% by mass in total of the polyfunctional monomer units.

Further, Patent Literature 3 discloses a thermoplastic resin composition prepared by blending a graft copolymer (I) obtained by graft-polymerizing a monomer mixture (B) including an aromatic vinyl-based monomer (c) and a vinyl cyanide-based monomer (d) in the presence of an acrylic rubbery polymer (A) having a volume average particle diameter of 0.10 to 0.30 μm obtained by copolymerizing 97% to 99.5% by weight of an acrylic acid ester-based monomer (a) and 0.5% to 3% by weight of a polyfunctional monomer (b), and a (meth)acrylic (co)polymer (II) obtained by polymerizing or copolymerizing a monomer including 50% to 100% by weight of an alkyl unsaturated carboxylate ester-based monomer (e) or a monomer mixture (C), in which 30 to 70 parts by weight of the graft copolymer (I) and 30 to 70 parts by weight of the (meth)acrylic (co)polymer are blended with respect to 100 parts by weight of the sum total of the graft copolymer (I) and the (meth)acrylic (co)polymer (II), in which the graft copolymer (I) is a copolymer in which the ratio $((\alpha)/(\beta))$ of the degree of gel swelling $(\alpha)$ of the acrylic rubbery polymer (A) in toluene to the degree of grafting $(\beta)$ of the graft copolymer (I) satisfies the formula: $0.4 \leq (\alpha)/(\beta) \leq 2.0$, and has a structure where particles of the graft copolymer (I) are aggregated in the thermoplastic resin composition.

CITATIONS LIST

Patent Literature

Patent Literature 1: JP-A 2003-335827
Patent Literature 2: JP-A 2012-214734
Patent Literature 3: JP-A 2016-180096

SUMMARY OF INVENTION

Technical Problems

An object of the present invention is to provide a thermoplastic resin composition which leads to a molded article having further improved weatherability as compared with conventionally known molding materials.

Solutions to Problems

The present invention is as follows.

1. A thermoplastic resin composition characterized in that the composition inch ides (A) a rubber-reinforced vinyl-based resin including a rubbery part derived from an acrylic rubbery polymer and a resin part having a structural unit derived from an aromatic vinyl compound and a structural unit derived from a cyanidated vinyl compound, (B) a (meth)acrylic resin composed of a (co)polymer having a structural unit derived from an alkyl (meth)acrylate ester compound and no structural unit derived from α-methyl styrene, the (meth)acrylic resin excluding the rubber-reinforced vinyl-based resin (A), and (C) an α-methyl styrene-based resin composed of a (co)polymer having a structural unit derived from α-methyl styrene and no structural unit derived from an alkyl (meth)acrylate ester compound, α-methyl styrene-based resin excluding the rubber-reinforced vinyl-based resin (A), and that content ratios of the rubber-reinforced vinyl-based resin (A), the (meth)acrylic resin (B), and the α-methyl styrene based resin (C) are respectively 10% to 70% by mass, 5% to 80% by mass, and 5% to 70% by mass based on 100% by mass of a total of the contents.

2. The thermoplastic resin composition according to 1 above, wherein a content ratio of the structural unit derived from the alkyl (meth)acrylate ester compound constituting the (meth)acrylic resin (B) is 50% by mass or more with respect to a total amount of the structural units constituting the (meth)acrylic resin (B).

3. The thermoplastic resin composition according to 1 or 2 above, wherein the (meth)acrylic resin (B) is a resin further including a structural unit derived from an aromatic vinyl compound excluding α-methyl styrene and a structural unit derived from a cyanidated vinyl compound.

4. The thermoplastic resin composition according to any one of 1 to 3 above,
    wherein a content ratio of the structural unit derived from the α-methyl styrene constituting the α-methyl styrene-based resin (C) is 60% by mass or more with respect to a total amount of the structural units constituting the α-methyl styrene-based resin (C).

5. The thermoplastic resin composition according to any one of 1 to 4 above,
  wherein a content ratio of the rubbery part constituting the rubber-reinforced vinyl-based resin (A) is in a range from 5% to 40% by mass with respect to a whole of the composition.

6. A molded article including the thermoplastic resin composition according to any one of 1 to 5 above.

Advantageous Effects of Invention

According to the thermoplastic resin composition of the present invention, it is possible to obtain a molded article having excellent weatherability such that change in color tone and deterioration in surface gloss are suppressed when used outdoors where it is to be exposed to sunlight.

DESCRIPTION OF EMBODIMENTS

Hereinafter, the present invention will be described in detail. In the description, "(meth)acryrl" means acryl and methacryl, "(meth)acrylate" means acrylate and methacrylate, "(meth)acrloyl" means acryloyl and methacryloyl, "(meth)allyl" means allyl and methallyl, and "(co)polymer" means homopolymer and copolymer.

The thermoplastic resin composition of the present invention is a composition including (A) a rubber-reinforced vinyl-based resin composed of a rubbery part derived from an acrylic rubbery polymer and a resin part having a structural unit derived from an aromatic vinyl compound and a structural unit derived from a cyanidated vinyl compound (hereinafter, referred to as "component (A)"), (B) a (meth)acrylic resin composed of a (co)polymer having a structural unit derived from an alkyl (meth)acrylate ester compound (excluding the rubber-reinforced vinyl-based resin (A) (hereinafter, referred to as "component (B)"), and (C) an α-methyl styrene-based resin composed of a (co)polymer having a structural unit derived from α-methyl styrene and no structural unit derived from an alkyl (meth) acrylate ester compound (excluding the rubber-reinforced vinyl-based resin (A) (hereinafter, referred to as "component (C)") in specific content ratios.

The thermoplastic resin composition of the present invention essentially includes the components (A), (B) and (C), but it may further include other thermoplastic resins or additives (both described later).

The component (A) is a rubber-reinforced vinyl-based resin composed of a rubbery part derived from an acrylic rubbery polymer and a resin part having a structural unit derived from an aromatic vinyl compound and a structural unit derived from a cyanidated vinyl compound. Content ratios of the rubbery part and the resin part in the component (A) are particularly limited, but are, respectively, preferably 35% to 85% by mass and 15% to 65% by mass, and more preferably 55% to 80% by mass and 20% to 45% by mass based on 100% by mass of a total of the these parts.

The component (A) is preferably a graft resin in which a rubbery part and a resin part are chemically bonded obtained by polymerizing a vinyl-based monomer including an aromatic vinyl compound and a cyanidated vinyl compound in the presence of an acrylic rubbery polymer.

The acrylic rubbery polymer is not particularly limited as long as it is one being composed of a (co)polymer having a structural unit derived from an alkyl acrylate ester compound and having a glass transition temperature of lower than 0° C.

The acrylic rubbery polymer is preferably a copolymer having a structural unit derived from an alkyl acrylate ester compound (hereinafter, referred to as "structural unit (x1)") and a structural unit derived from a polyfunctional monomer (hereinafter, referred to as "structural unit (x2)"), and the copolymer may further include a structural unit derived from other monomer (hereinafter, referred to as "structural unit (x3)").

Content ratios of the structural units (x1) and (x2) constituting the acrylic rubbery polymer of the preferred embodiment are, respectively, preferably 95% to 99.99% by mass and 0.01% to 5% by mass, and more preferably 97.5% to 99.9% by mass and 0.1% to 2.5% by mass based on 100% by mass of a total of the these structural units from viewpoints of appearance, weatherability and impact resistance. In the acrylic rubbery polymer having the structural unit (x3), an upper limit of the content ratio of the structural unit (x3) is preferably 20% by mass, and more preferably 10% by mass based on 100% by mass of a total of the structural units (x1), (x2), and (x3).

The alkyl acrylate ester compound is preferably an alkyl acrylate ester compound having an alkyl group having 1 to 12 carbon atoms in its ester part. Examples thereof include methyl acrylate, ethyl acrylate, n-propyl acrylate, isopropyl acrylate, n-butyl acrylate, isobutyl acrylate, sec-butyl acrylate, tert-butyl acrylate, n-hexyl acrylate, n-octyl acrylate, 2-ethylhexyl acrylate, cyclohexyl acrylate, and the like. Among these, n-butyl acrylate is preferable.

The polyfunctional monomer is preferably a compound having two or more carbon atom-carbon atom unsaturated bonds, and particularly preferably a compound having two unsaturated bonds, three unsaturated bonds, and the like.

Examples of the compound having two unsaturated bonds include allyl (meth)acrylate, diallyl maleate, diallyl fumarate, diallyl phthalate, triallyl cyanurate, triallyl isocyanurate, ethylene glycol di(meth)acrylate, diethylene glycol di(meth)acrylate, propylene glycol di(meth)acrylate, 1,3-butanediol di(meth)acrylate, 1,6-hexanediol di(meth)acrylate, trimethylolpropane triacrylate, 2-propenyl acrylate, divinyl benzene, and the like.

Examples of the other monomer include an alkyl methacrylate ester compound such as methyl methacrylate, ethyl methacrylate, n-propyl methacrylate, isopropyl methacrylate, n-butyl methacrylate, isobutyl methacrylate, sec-butyl methacrylate, tert-butyl methacrylate, n-hexyl methacrylate, n-octyl methacrylate, 2-ethylhexyl methacrylate, cyclohexyl methacrylate, phenyl methacrylate, and benzyl methacrylate; an aromatic vinyl compound; a cyanidated vinyl compound; a maleimide-based compound; an unsaturated acid anhydride; a carboxyl group-containing unsaturated compound; an amino group-containing unsaturated compound; an amide group-containing unsaturated compound; a hydroxyl group-containing unsaturated compound; and the like.

The rubbery part constituting the component (A) preferably has a spherical shape or a deformed shape thereof, and a volume average particle diameter of the rubbery part is preferably in a range from 60 to 500 nm, more preferably from 60 to 400 nm, and further preferably from 60 to 200 nm, horn viewpoints of mechanical strength and appearance. As to the volume average particle diameter, a slice prepared from a molded article including the thermoplastic resin composition of the present invention is stained by immersing it in a solution of $OsO_4$ or $RuO_4$, and then is observed with a transmission electron microscope. A volume-converted average value of particle diameters measured for 100 rubbery parts of the component (A), for example, may be taken as the volume average particle diameter.

On the other hand, the resin part constituting the component (A) has a structural unit derived from an aromatic vinyl compound (hereinafter, referred to as "structural unit (y1)") and a structural unit derived from a cyanidated vinyl compound (hereinafter, referred to as "structural unit (y2)") and may further have other structural unit (hereinafter, referred to as "structural unit (y3)"), as necessary.

The aromatic vinyl compound forming the structural unit (y1) is not particularly limited as long as it is a compound having at least one vinyl bond and at least one aromatic ring. It, however, shall not have any substituents such as functional groups. Examples thereof include styrene, α-methyl styrene, o-methyl styrene, p-methyl styrene, β-methyl styrene, ethyl styrene, p-tert-butyl styrene, vinyltoluene, vinylxylene, vinylnaphthalene, and the like. Among these, styrene is preferable.

Examples of the cyanidated vinyl compound forming the structural unit (y2) include acrylonitrile, methacrylonitrile, ethacrylonitrile, α-isopropylacrylonitrile, and the like. Among these, acrylonitrile is preferable.

In the resin part constituting the component (A), content ratios of the structural units (y1) and (y2) are not particularly limited, but are, respectively, preferably 60% to 95% by mass and 5% to 40% by mass, and more preferably 65% to 85% by mass and 15% to 35% by mass based on 100% by mass of a total of these structural units, from viewpoints of appearance and impact resistance.

The resin part constituting the component (A) may be either one composed of the structural units (y1) and (y2), or one composed of structural units (y1), (y2) and (y3) as described above. When the structural unit (y3) is contained, an upper limit of the content ratio thereof is preferably 50% by mass, and more preferably 30% by mass based on 100% by mass of a total amount of the structural units constituting the resin part.

Examples of the compound forming the structural unit (y3) include an alkyl (meth)acrylate ester compound; a maleimide-based compound; an unsaturated acid anhydride; a carboxyl group-containing unsaturated compound; an amino group-containing unsaturated compound; an amide group-containing unsaturated compound: a hydroxyl group-containing unsaturated compound; and the like.

Examples of the maleimide-based compound include maleimide, N-methyl maleimide, N-isopropyl maleimide, N-butyl maleimide, N-dodecyl maleimide, N-phenyl maleimide, N-(2-methylphenyl) maleimide, N-(4-methylphenyl) maleimide, N-(2,6-dimethylphenyl) maleimide, N-(2,6-diethylphenyl) maleimide, N-benzyl maleimide, N-naphthyl maleimide, N-cyclohexyl maleimide, and the like. When a structural unit derived from a maleimide-based compound is introduced into a polymer chain, for example, a method of copolymerizing maleic anhydride, followed by performing imidization can be applied.

Examples of the unsaturated acid anhydride include maleic anhydride, itaconic anhydride, citraconic anhydride, 2,3-dimethyl maleic anhydride, and the like.

Examples of the carboxyl group-containing unsaturated compound include (meth)acrylic acid, ethacrylic acid, maleic acid, fumaric acid, itaconic acid, crotonic acid, cinnamic acid, and the like.

Examples of the amino group-containing unsaturated compound include aminoethyl acrylate, propylaminoethyl acrylate, dimethylaminomethyl acrylate, diethylaminomethyl acrylate, 2-dimethylaminoethyl acrylate, aminoethyl methacrylate, propylaminoethyl methacrylate, dimethylaminomethyl methacrylate, diethylaminomethyl methacrylate, 2-dimethylaminoethyl methacrylate, phenylaminoethyl methacrylate, p-amino styrene, N-vinyldiethylamine, N-acetylyinylamine, acrylamine, methacrylamine, N-methylacrylamine, and the like.

Examples of the amide group-containing unsaturated compound include acrylamide, N-methyl acrylamide, methacrylamide, N-methylmethacrylamide, and the like.

Examples of the hydroxyl group-containing unsaturated compound include a (meth)acrylic acid ester having a hydroxyl group such as hydroxymethyl (meth)acrylate, 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, 4-hydroxybutyl (meth)acrylate, polyethylene glycol mono(meth)acrylate and polypropylene glycol mono(meth)acrylate; o-hydroxystyrene, m-hydroxystyrene, p-hydroxystyrene, o-hydroxy-α-methyl styrene, m-hydroxy-α-methyl styrene, p-hydroxy-α-methyl styrene, 2-hydroxymethyl-α-methyl styrene, 3-hydroxymethyl-α-methyl styrene, 4-hydroxymethyl-α-methyl styrene, 4-hydroxymethyl-1-vinylnaphthalene, 7-hydroxymethyl-1-vinylnaphthalene, 8-hydroxymethyl-1-vinylnaphthalene, 4-hydroxymethyl-1-isopropenylnaphthalene, 7-hydroxymethyl-1-isopropenylnaphthalene, 8-hydroxymethyl-1-isopropenylnaphthalene, p-vinylbenzyl alcohol, 3-hydroxy-1-propene, 4-hydroxy-1-butene, cis-4-hydroxy-2-butene, trans-4-hydro-2-butene, 3-hydroxy-2-methyl-1-propene, and the like.

A graft ratio of the component (A) which is a graft resin, is preferably 20% or more, more preferably 25% or more, and particularly in a range from 30% to 80% from viewpoints of appearance and impact resistance.

The graft ratio can be determined from the following equation.

$$\text{Graft ratio } (\%) = \{(S-T)/T\} \times 100$$

In the equation, S is the mass (g) of insolubles obtained by charging 1 g of the component (A) in 20 ml of acetonitrile, shaking it with a shaker for 2 hours, and then centrifuging it to separate insolubles and solubles, and T is the mass (g) of the rubbery part derived from the acrylic rubbery polymer contained in 1 g of the component (A). The mass of the rubbery part can be determined by a method of calculating it from the polymerization recipe and the polymerization conversion, a method of determining it by infrared absorption spectrum (IR), or the like.

The component (A) is preferably a rubber-reinforced vinyl-based resin having a rubbery part derived from an acrylic rubbery polymer and a resin part composed of structural units (y1) and (y2), or a rubber-reinforced vinyl-based resin having a rubbery part derived from an acrylic rubbery polymer and a resin part composed of structural units (y1), (y2), and (y3).

The component (A) in the thermoplastic resin composition of the present invention may be only one type or be two or more types.

The component (B) is a (meth)acrylic resin that is composed of at least one (co)polymer having a structural unit derived from an alkyl (meth)acrylate ester compound (hereinafter, referred to as "structural unit (b1)" and having no structural unit derived from α-methyl styrene, and that is not included in the component (A).

A content ratio of the structural unit (b1) contained in the component (B) is not particularly limited, but a lower limit of the content ratio of the structural unit (b1) contained in a component (B) is preferably 40% by mass based on 100% by mass of a total amount of the structural units contained in the component (B) from viewpoints of molding processability and weatherability.

The alkyl (meth)acrylate ester compound forming the structural unit (b1) is preferably an alkyl methacrylate ester compound, and is particularly preferably an alkyl methacrylate ester compound having an alkyl group having 1 to 5 carbon atoms in its ester part.

The component (B) may be either a component composed of at least one structural unit (b1) (hereinafter, referred to as "component (B1)"), or a component composed of the structural unit (b1) and a structural unit derived from other monomer such as an aromatic vinyl compound (excluding α-methyl styrene), a cyanidated vinyl compound, a maaleimide-based compound, an unsaturated acid anhydride, a carboxyl group-containing unsaturated compound, an amino group-containing unsaturated compound, an amide group-containing unsaturated compound, and a hydroxyl group-containing unsaturated compound (hereinafter, referred to as "structural unit (b2)") (hereinafter, referred to as "component (B2)"). In a case of the component (B2), the structural unit (b2) contained may include either one or two or more thereof: and an upper limit of the (total) content ratio is preferably 60% by mass based on 100% by mass of a total amount of the structural units contained in the component (B2).

Other monomer forming the structural unit (b2) preferably includes an aromatic vinyl compound (excluding α-methyl styrene) and a cyanidated vinyl compound.

When the component (B2) includes a structural unit derived from an aromatic vinyl compound (excluding α-methyl styrene) as one of the structural units (b2), a content ratio thereof is preferably in a range from 1% to 49% by mass, more preferably from 5% to 45% by mass, and further preferably from 15% to 35% by mass based on 100% by mass of a total amount of the structural units contained in the component (B2).

When the component (B2) includes a structural unit derived from a cyanidated vinyl compound as one of the structural units (b2), a content ratio thereof is preferably in a range from 1% to 36% by mass, more preferably from 2% to 32% by mass, and further preferably from 6% to 20% by mass based on 100% by mass of a total amount of the structural units contained in the component (B2).

The aromatic vinyl compound is preferably a styrene, and the cyanidated vinyl compound is preferably an acrylonitrile.

When the component (B2) is composed of the structural unit (b1), a structural unit derived from an aromatic vinyl compound (excluding α-methyl styrene), and a structural unit derived from a cyanidated vinyl compound, content ratios are, respectively, preferably 50% to 98% by mass, 1% to 49% by mass, and 1% to 36% by mass, more preferably 60% to 81% by mass, 15% to 35% by mass, and 4% to 25% by mass, based on 100% by mass of a total of these structural units.

As described above, the components (B1) and (B2) can be used as the component (B). In the present invention, a combination of these components is a preferred embodiment, and it is preferable to use at least one type of the component (B1), that is, a (co)polymer composed of at least one structural unit (b1) together with at least one type of the component (B2), that is, a copolymer composed of structural units (b1) and (b2), such as a copolymer composed of the structural unit (b1) and a structural unit derived from an aromatic vinyl compound (excluding α-methyl styrene) and a copolymer composed of the structural unit (b1), a structural unit derived from an aromatic vinyl compound (excluding α-methyl styrene), and a structural unit derived from a cyanidated vinyl compound.

When the components (B1) and (B2) are used in combination, content ratios are, respectively, preferably 30% to 90% by mass and 10% to 70% by mass, and more preferably 40% to 80% by mass and 20% to 60% by mass based on 100% by mass of a total of these components from a viewpoint of balance of mechanical strength.

A limiting viscosity $[\eta]$ (in methyl ethyl ketone, at 30° C.) of the component (B) is preferably in a range from 0.2 to 1.2 dl/g, more preferably from 0.3 to 1.0 dl/g, and further preferably from 0.35 to 0.7 dl/g from viewpoints of molding processability and mechanical strength.

The component (C) is an α-methyl styrene-based resin (excluding the above component (A)) composed of at least one (co)polymer having a structural unit derived from α-methyl styrene (hereinafter, referred to as "structural unit (c1)") and having no structural unit derived from an alkyl (meth)acrylate ester compound.

A content ratio of the structural unit (c1) contained in the component (C) is preferably 60% by mass or more, more preferably in a range from 65% to 95% by mass, and further preferably from 70% to 90% by mass based on 100% by mass of a total amount of the structural units from viewpoints of weatherability and heat resistance.

The component (C) may be either a poly-α-methyl styrene or a polymer composed of the structural unit (c1) and a structural unit (hereinafter referred to as "structural unit (c2)") derived from other monomer such as an aromatic vinyl compound (excluding α-methyl styrene), a cyanidated vinyl compound, a maleimide-based compound, an unsaturated acid anhydride, a carboxyl group-containing unsaturated compound, an amino group-containing unsaturated compound, an amide group-containing unsaturated compound, and a hydroxyl group-containing unsaturated compound.

The other monomer forming the structural unit (c2) includes preferably an aromatic vinyl compound (excluding α-methyl styrene) and a cyanidated vinyl compound. The aromatic vinyl compound is preferably a styrene, and the cyanidated vinyl compound is preferably an acrylonitrile.

When the component (C) is composed of the structural unit (c1), a structural unit derived from an aromatic vinyl compound (excluding α-methyl styrene) and a structural unit derived from a cyanidated vinyl compound, content ratios are, respectively, preferably 40% to 95% by mass, 1% to 30% by mass, and 4% to 40% by mass, and more preferably 45% to 80% by mass, 3% to 25% by mass, and 15% to 35% by mass based on 100% by mass of a total of these structural units.

When the component (C) is composed of the structural unit (c1) and a structural unit derived from a cyanidated vinyl compound, content ratios are, respectively; preferably 60% to 95% by mass and 5% to 40% by mass, and more preferably 65% to 85% by mass and 15% to 35% by mass based on 100% by mass of a total of these structural units.

The component (C) is preferably a copolymer, and is particularly preferably a copolymer composed of the structural unit (el), a structural unit derived from an aromatic vinyl compound (excluding α-methyl styrene), and a structural unit derived F om a cyanidated vinyl compound, or a copolymer composed of the structural unit (c1) and a structural unit derived from a cyanidated vinyl compound.

A limiting viscosity [η] (in methyl ethyl ketone, at 30° C.) of the component (C) is preferably in a range from 0.2 to 1.2 dl/g, more preferably from 0.3 to 1.0 dl/g, and further preferably from 0.35 to 0.7 dl/g from viewpoints of molding processability and mechanical strength.

In the present invention, content ratios of the components (A), (B) and (C) are, respectively, 10% to 70% by mass, 5% to 80% by mass, and 5% to 70% by mass, preferably 15% to 65% by mass, 15% to 70% by mass, and 7% to 55% by mass, and more preferably 20% to 55% by mass, 20% to 60% by mass, and 10% to 45% by mass based on 100% by mass of a total of these components, since it is possible to obtain a molded article having excellent weatherability such that change in color tone and deterioration in surface gloss are suppressed when used outdoors or the like for a long period of time.

The thermoplastic resin composition of the present invention may, as described above, include other thermoplastic resin in addition to the components (A), (B) and (C). When the other thermoplastic resin is contained, an upper limit of the content ratio thereof is preferably 70 parts by mass, and more preferably 50 parts by mass based on 100 parts by mass of a total of the components (A), (B) and (C).

Examples of the other thermoplastic resin include an aromatic vinyl-based copolymer composed of a structural unit derived from an aromatic vinyl compound (excluding α-methyl styrene) and a structural unit derived from at least one selected from a group consisting of a cyanidated vinyl compound, a maleimide-based compound, an unsaturated acid anhydride, a carboxyl group-containing unsaturated compound, an amino group-containing unsaturated compound, an amide group-containing unsaturated compound, and a hydroxyl group-containing unsaturated compound; a rubbery polymer-reinforced vinyl-based resin composed of a rubbery part derived from at least one selected from a group consisting of a diene-based rubbery polymer, an ethylene/α-olefin-based rubbery polymer, a hydrogenated diem-based rubbery polymer and a silicone rubbery polymer and a resin part having a structural unit derived from a vinyl-based monomer other than α-methyl styrene; a polyolefin resin; a polyamide resin; a polyester resin; a polycarbonate resin; a polyvinyl chloride resin; a polyvinylidene chloride resin; and the like. Among these, an aromatic vinyl-based copolymer is preferred.

When the other thermoplastic resin is an aromatic vinyl-based copolymer, a limiting viscosity [η] thereof (in methyl ethyl ketone, at 30° C.) is preferably in a range from 0.2 to 1.0 dl/g, more preferably from 0.3 to 0.8 dl/g, and further preferably from 0.4 to 0.7 dl/g from viewpoints of molding processability and mechanical strength.

In the thermoplastic resin composition of the present invention, a content ratio of the rubbery part constituting the component (A) is preferably in a range from 5% to 50% by mass, more preferably from 10% to 40% by mass, and thither preferably from 15% to 35% by mass based on 100% by mass of a total of the components (A), (B), and (C) from viewpoints of mechanical strength and appearance.

Further, a content ratio of the rubbery part constituting the component (A) is preferably in a range from 5% to 40% by mass more preferably from 10% to 40% by mass, and further preferably from 15% to 35% by mass based on 100% by mass of a whole of the composition from viewpoints of mechanical strength and appearance.

The thermoplastic resin composition of the present invention may, as described above, include additives. Examples of the additives include a filler, a plasticizer, an antioxidant, an ultraviolet absorbent, an antiaging agent, a flame retardant a stabilizer, a weathering agent, alight stabilizer, a thermal stabilizer, an antistatic agent, an oil repellent agent, an antibacterial agent, a preservative, a colorant (pigment, dye), and the like.

The thermoplastic resin composition of the present invention can be produced by kneading raw material components using various types of an extruder, a Banbury mixer, a kneader, a roll, a feeder ruder, and the like and it can be processed to have a prescribed shape. A kneading temperature is selected in accordance with the type, the amount, etc. of the raw material components, and is usually in a range from 220° C. to 270° C. A method of using the raw material components is not particularly limited. The components may be compounded together at once and kneaded, or alternatively may be compounded in multiple stages and kneaded.

As a raw material to be used for the component (A), a rubber-reinforced vinyl-based resin obtained by polymerizing a vinyl-based monomer including an aromatic vinyl compound and a cyanidated vinyl compound in the presence of an acrylic rubbery polymer can be used. This Rubber-reinforced vinyl-based resin generally includes a component (A) and an aromatic vinyl-based copolymer having a structural unit derived from an aromatic vinyl compound and a structural unit derived from a cyanidated vinyl compound (as other thermoplastic resin). A volume average particle diameter of the acrylic rubbery polymer is approximately the same as the volume average particle diameter of the rubbery part constituting the component (A) contained in the thermoplastic resin composition of the present invention.

The molded article of the present invention is characterized by including a thermoplastic resin composition. The molded article of the present invention can be produced by subjecting a thermoplastic resin composition to a conventionally known molding method, such as an injection molding method, an injection compression molding method, a press molding method, an extrusion method, a co-extrusion method, a sheet extrusion method, a profile extrusion method, a vacuum molding method, a blow molding method, a compression molding method, a casting method, and a roll forming method.

The molded article of the present invention is preferably used outdoors or under an environment where it is exposed to sunlight even indoors, and it is suitable as a vehicle exterior component, an outdoor use housing, an exterior part, and the like, which are excellent in weatherability. According to the evaluation method in the following EXAMPLES, the color difference before and after light irradiation, that is, the change in color tone ΔE can preferably be adjusted to less than 1.0. In addition, the molded article of the present invention can have surface gloss, and in this case, the gloss retention thereof can preferably be adjusted to 85% or more according to the evaluation method in the following EXAMPLES.

EXAMPLES

Hereinafter, the present invention will be described more specifically by way of Examples, but these Examples are only illustrative and not intended to limit a scope of the present invention. In the following description, part(s) and % are in terms of mass unless otherwise specified.

1. Raw Materials for Production

The raw materials used in Examples 1 to 10 and Comparative Examples 1 to 4 are as follows. In addition, the measurement of a graft ratio was performed according to the method described above.

1-1. Raw Material (P)

Into a glass flask equipped with a stirrer, 85 parts of ion-exchanged water, 0.7 part of potassium rosinate, 0.45 part of sodium hydrogencarbonate, 0.15 part of sodium carbonate, 0.5 part of sodium naphthalene sulfonate formaldehyde condensate, and 0.03 part of sodium dithionite were added in a nitrogen stream. As a monomer, 5 parts of n-butyl acrylate was added, and the temperature was raised with stirring. When the internal temperature reached 75° C., 0.12 part of potassium persulfate was added to initiate polymerization. After the polymerization for one hour, 0.06 part of potassium persulfate, 44.5 parts of n-butyl acrylate, and 0.5 part of allyl methacrylate were continuously added over 3 hours, and polymerization was continued for another one hour. Then, after cooling to 65° C., 33 parts of ion-exchanged water, 0.8 part of potassium rosinate, and 0.07 part of tert-butyl hydroperoxide were added, further a solution of 0.4 part of sodium pyrophosphate, 0.01 part of ferrous sulfate heptahydrate, and 0.3 part of glucose dissolved in 15 parts of ion-exchanged water, 10.95 parts of styrene, and 4.05 parts of acrylonitrile were added, and the temperature was raised to 75° C. After polymerization for one hour, 25.55 parts of styrene, 9.45 parts of acrylonitrile, 0.1 part of tert-dodecylmercaptan, and 0.2 part of tert-butyl hydroperoxide were continuously added over 4 hours, and polymerization was continued for another one hour. After coagulating with a magnesium sulfate solution and washing with water, the resulting solid was dried, affording a rubber-reinforced resin. This rubber-reinforced resin was used as raw material (P). A graft ratio of the rubber-reinforced vinyl-based resin contained in the raw material (P) was 40%, and a content of an ungrafted acrylonitrile/styrene copolymer (acetonitrile solubles) corresponding to the other thermoplastic resin was 30% and a limiting viscosity [η] (in methyl ethyl ketone, at 30° C.) of the acetonitrile solubles was 0.43 dl/g.

1-2. Raw Material (Q)

As raw material (Q), (Q-1) or (Q-2) shown below was used.

(Q-1) is a styrene/acrylonitrile/methyl methacrylate copolymer in which content ratios of styrene unit, acrylonitrile unit, and methyl methacrylate unit are, respectively, 21%, 7%, and 72%, having a limiting viscosity [η] (measured in methyl ethyl ketone at 30° C.) of 0.35 dl/g.

(Q-2) is an acrylic resin "ACRYPET VH" (trade name) manufactured by Mitsubishi Rayon Co., Ltd. This product is a poly methyl methacrylate having a weight average molecular weight (Mw) of 97,000 measured by GPC.

1-3. Raw Material (R)

Raw material (R) is an acrylonitrile/styrene copolymer in which content ratios of acrylonitrile unit and α-methyl styrene unit are, respectively, 23.3% and 76.7%, having a limiting viscosity [η] (measured in methyl ethyl ketone at 30° C.) of 0.39 dl/g.

1-4. Raw Material (S)

Raw material (S), which corresponds to the other thermoplastic resin, is an acrylonitrile/styrene copolymer in which content ratios of acrylonitrile unit and styrene unit are, respectively, 32.8% and 67.2%, having a limiting viscosity [η] (measured in methyl ethyl ketone at 30° C.) of 0.52 dl/g.

1-5. Raw Material (I)

Raw material (T) is an additive.

(T-1) is "CHIMASSORB 944LD" (trade name) manufactured by BASF Japan Ltd., which is a light stabilizer.

(T-2) is "TINUVIN 234" (trade name) manufactured by BASF Japan Ltd., which is a light stabilizer.

(T-3) is "ADK STAB AO-60" (trade name) manufactured by ADEKA Corporation, which is an antioxidant.

(T-4) is "ADK STAB AO-60" (trade name) manufactured by ADEKA Corporation, which is an antioxidant.

2. Production and Evaluation of Weather-Resistant Resin Composition

Examples 1 to 10 and Comparative Examples 1 to 4

The raw materials (P), (Q), (R), (S), and (T) in the proportions shown in Table 1 were mixed using a Henschel mixer, and the mixture was then fed to an injection molding machine "α-150" (model name) manufactured by FAN Corporation and melt-kneaded (cylinder set temperature: 230° C. to 250° C.), affording pellets of a thermoplastic resin composition. Subsequently, the pellets was used to measure a melt mass flow rate under the conditions represented by a temperature of 220° C. and a load of 98 N in accordance with ISO 1133, and evaluation of fluidity (molding processability) was performed. Moreover, the pellets were subjected to injection molding to prepare specimens for the evaluation of impact resistance, rigidity, and heat resistance, which were evaluated by the following methods.

(1) Impact Resistance

Charpy impact strength was measured at a temperature of 23° C. in accordance with ISO 179. The unit thereof is "kJ/m$^2$".

(2) Rigidity

A flexural modulus was measured at a temperature of 23° C. in accordance with ISO 178.

(3) Heat Resistance

A heat distortion temperature was measured with a load of 1.80 MPa in accordance with ISO 75.

Next, a method of evaluating weatherability is described.

The raw materials (P), (Q), (R), (S) and (T) in the proportions shown in Table 1 were mixed using a Henschel mixer, and a master batch "Royal Black 2860" (trade name, composed of a styrene/acrylonitrile copolymer and carbon black) manufactured by ECCA Co., Ltd. was then added to 100 parts of the mixture such that the content ratio of carbon black would be 0.9 part, and these were fed to an injection molding machine "α-150" (model name) manufactured by FANUC Corporation and melt-kneaded (cylinder set temperature: 230° C. to 250° C.), affording pellets of a thermoplastic resin composition. Subsequently, the pellets were subjected to injection molding to prepare a black specimen having a length of 80 mm, a width of 55 mm and a thickness of 2.5 mm.

After that, an accelerated test in which the specimen was exposed for 1000 hours with a rainfall cycle of 18 minutes/120 minutes, a black panel temperature of 63° C. and an irradiation energy of 180 W/m$^2$ was carried out using Super Xenon Weather Meter "SX 75" (model name) manufactured by Saga Test Instruments Co., Ltd. The change in color tone ΔE between before and after that and the gloss retention were obtained.

A degree of discoloration L*a*b* (L*; brightness a*, redness b*; yellowness) was measured by color measurement by an SCE method using a multiple light source spectrophotometer manufactured by Suga Test Instruments Co., Ltd., and a change in color tone ΔE was calculated from the following equation, $$\Delta E = \sqrt{[(L^*_1 - L^*_2)^2 + (a^*_1 - a^*_2)^2 + (b^*_1 - b^*_2)]}$$

wherein $L^*_1$, $a^*_1$ and $b^*_1$ represent values before exposure, and $L^*_2$, $a^*_2$ and $b^*_2$ represent values after exposure.

The smaller the value of ΔE, the smaller the degree of color change and the better the color tone.

The glossiness of the surface of the specimen was measured before and after the exposure in accordance with JIS K7105 by using a digital gloss meter "GM-26D" (model name) manufactured by Murakami Color Research Laboratory with a measuring angle of 60 degrees, and then (glossiness after exposure/glossiness before exposure) was calculated as a gloss retention.

Table 1

TABLE 1

|  |  |  |  | Example |  |  |  |  |  |  |  |  |  | Comparative Example |  |  |  |
|---|---|---|---|---|---|---|---|---|---|---|---|---|---|---|---|---|---|
|  |  |  |  | 1 | 2 | 3 | 4 | 5 | 6 | 7 | 8 | 9 | 10 | 1 | 2 | 3 | 4 |
| Thermo-plastic resin composition | Compounding amount (parts) | Raw material (P) |  | 45 | 45 | 35 | 55 | 45 | 45 | 55 | 45 | 35 | 45 | 45 | 45 | 45 | 2 |
|  |  | Raw material (Q) | Q-1 | 35 | 25 | 30 |  |  |  | 10 | 15 | 20 | 5 |  | 25 | 2 | 25 |
|  |  |  | Q-2 |  |  |  | 20 | 35 | 25 | 15 | 20 | 25 | 20 |  |  |  |  |
|  |  | Raw material (R) |  | 10 | 20 | 25 | 20 | 10 | 20 | 20 | 20 | 20 | 20 |  | 2 | 30 | 30 |
|  |  | Raw material (S) |  | 10 | 10 | 10 | 5 | 10 | 10 |  |  |  | 10 | 55 | 28 | 23 | 43 |
|  |  | Raw material (T) | T-1 | 0.6 | 0.6 | 0.6 | 0.6 | 0.6 | 0.6 | 0.6 | 0.6 | 0.6 | 0.6 | 0.6 | 0.6 | 0.6 | 0.6 |
|  |  |  | T-2 | 0.6 | 0.6 | 0.6 | 0.6 | 0.6 | 0.6 | 0.6 | 0.6 | 0.6 | 0.6 | 0.6 | 0.6 | 0.6 | 0.6 |
|  |  |  | T-3 | 0.3 | 0.3 | 0.3 | 0.3 | 0.3 | 0.3 | 0.3 | 0.3 | 0.3 | 0.3 | 0.3 | 0.3 | 0.3 | 0.3 |
|  |  |  | T-4 | 0.3 | 0.3 | 0.3 | 0.3 | 0.3 | 0.3 | 0.3 | 0.3 | 0.3 | 0.3 | 0.3 | 0.3 | 0.3 | 0.3 |
|  |  | Total |  | 101.8 | 101.8 | 101.8 | 101.8 | 101.8 | 101.8 | 101.8 | 101.8 | 101.8 | 101.8 | 101.8 | 101.8 | 101.8 | 101.8 |
|  | Configuration | Component (A) *1 | (%) | 41.5 | 41.5 | 31.1 | 49.4 | 41.5 | 41.5 | 46.5 | 36.7 | 27.7 | 41.5 | 100 | 54.2 | 50.0 | 2.5 |
|  |  | Component (B) *1 | (%) | 45.5 | 32.5 | 37.6 | 25.3 | 45.5 | 32.5 | 29.7 | 40.3 | 50.1 | 32.5 | 0 | 42.4 | 3.1 | 44.3 |
|  |  | Component (C) *1 | (%) | 13.0 | 26.0 | 31.3 | 25.3 | 13.0 | 26.0 | 23.8 | 23.0 | 22.3 | 26.0 | 0 | 3.4 | 46.9 | 53.2 |
|  |  | Other resin *2 | (part(s)) | 30.0 | 30.0 | 25.2 | 26.5 | 30.0 | 30.0 | 19.0 | 15.0 | 11.3 | 30.0 | 213.0 | 69.6 | 56.4 | 77.2 |
|  |  | Rubbery part derived from component (A) *3 | (%) | 22.5 | 22.5 | 17.5 | 27.5 | 22.5 | 22.5 | 27.5 | 22.5 | 17.5 | 22.5 | 22.5 | 22.5 | 22.5 | 1.0 |
| Evaluation | ΔE |  |  | 0.5 | 0.7 | 0.5 | 0.5 | 0.1 | 0.2 | 0.3 | 0.2 | 0.1 | 0.3 | 13.2 | 10.2 | 6.9 | 7.0 |
|  | Gloss retention |  | (%) | 90 | 88 | 90 | 85 | 95 | 89 | 93 | 95 | 95 | 92 | 55 | 48 | 83 | 65 |
|  | Melt mass flow rate |  | (g/10 minutes) | 8 | 4 | 7 | 5 | 4 | 5 | 5 | 7 | 10 | 6 | 7 | 12 | 11 | 45 |
|  | Charpy impact strength |  | (kJ/m$^2$) | 6 | 8 | 5 | 6 | 6 | 8 | 10 | 8 | 6 | 9 | 10 | 10 | 8 | 2 |
|  | Flexural modulus |  | (GPa) | 1600 | 1770 | 1700 | 1760 | 1700 | 1760 | 1900 | 1840 | 1700 | 1820 | 1940 | 1820 | 1790 | 1700 |
|  | Heat distortion temperature |  | (° C.) | 77 | 82 | 85 | 75 | 75 | 79 | 80 | 82 | 80 | 82 | 81 | 76 | 76 | 85 |

*1: A proportion based on 100% of total of components (A), (B), and (C).
*2: A proportion based on 100 parts of total of components (A), (B), and (C).
*3: A proportion based on 100% of the whole composition.

Table 1 shows the following:

Comparative Example 1, which is an example using a thermoplastic resin composition free of the components (B) and (C) according to the present invention, was high in ΔE and was poor in weatherability. Comparative Example 2, which is an example using a thermoplastic resin composition with a small content ratio of the component (C) being outside the range of the present invention, was high in ΔE and was poor in weatherability. Comparative Example 3, which is an example using a thermoplastic resin composition with a small content ratio of the component (B) being outside the range ofthe present invention, was high in ΔE and was poor in weatherability. Comparative Example 4, which is an example using a thermoplastic resin composition with a small content ratio of the component (A) being outside the range of the present invention, was high in ΔE and was poor in weatherability. On the other hand, all of Examples 1 to 10 afforded ΔE of less than 1.0 and were excellent in weatherability. In addition, all the Examples afforded a gloss retention of 85% or higher and were excellent also in appearance durability.

INDUSTRIAL APPLICABILITY

Molded articles obtained from the resin composition of the present invention are suitable for applications where chemical resistance, mechanical strength, and the like are required, for example, glazings such as window members for vehicles; vehicle exterior parts such as hoods, pillars, trunk lids, canopies, spoilers, and trims; vehicle interior parts such as cup holders, bezels for in-vehicle devices, and instrument panels; housings and parts of electric/electronic device such as (mobile) phones, smartphones, PDAs, (portable) DVD players, (portable) personal computers, (portable) game machines, (portable) touch panels, and cameras; OA-related parts such as printers and copiers; lighting instrument parts; and building materials parts such as signboards, display boards, window frames, and sashes.

The invention claimed is:

1. A thermoplastic resin composition, comprising:
    a rubber-reinforced vinyl-based resin comprising a rubbery part derived from an acrylic rubbery polymer having a structural unit derived from an alkyl acrylate ester compound and a resin part having a structural unit derived from styrene and a structural unit derived from acrylonitrile;
    a methacrylic resin comprising a (co)polymer having no structural unit derived from α-methyl styrene, that is at least one of a polymethyl methacrylate and a styrene/acrylonitrile/methyl methacrylate copolymer; and
    an α-methyl styrene-based resin composed of a (co)polymer having no structural unit derived from an alkyl (meth)acrylate ester compound, that is a copolymer of α-methyl styrene and acrylonitrile;
    wherein the styrene/acrylonitrile/methyl methacrylate copolymer comprises 15% to 35% by mass of a structural unit derived from styrene, 4% to 25% by mass of a structural unit derived from acrylonitrile, and 60% to 81% by mass of a structural unit derived from methyl methacrylate, based on 100% by mass of a total content of these structural units, and wherein content ratios of the rubber-reinforced vinyl-based resin, the methacrylic resin, and the α-methyl styrene-based resin are respectively 20% to 55% by mass, 20% to 60% by mass, and 10% to 45% by mass based on 100% by mass of a total of these components.

2. The thermoplastic resin composition according to claim 1, wherein a content ratio of the structural unit derived from the α-methyl styrene constituting the α-methyl styrene-based resin is 60% by mass or more with respect to a total amount of the structural units constituting the α-methyl styrene-based resin.

3. The thermoplastic resin composition according to claim 1, wherein a content ratio of the rubbery part constituting the rubber-reinforced vinyl-based resin is in a range from 5% to 40% by mass with respect to a whole of the thermoplastic resin composition.

4. A molded article, comprising the thermoplastic resin composition according to claim 1.

5. A thermoplastic resin composition, comprising:

a rubber-reinforced vinyl-based resin comprising a rubbery part derived from an acrylic rubbery polymer having a structural unit derived from an alkyl acrylate ester compound and a resin part having a structural unit derived from styrene and a structural unit derived from acrylonitrile;

a methacrylic resin comprising a (co)polymer having no structural unit derived from α-methyl styrene, consisting of a polymethyl methacrylate and a styrene/acrylonitrile/methyl methacrylate copolymer; and an α-methyl styrene-based resin composed of a (co)polymer having no structural unit derived from an alkyl (meth)acrylate ester compound, that is a copolymer of α-methyl styrene and acrylonitrile;

wherein the styrene/acrylonitrile/methyl methacrylate copolymer comprises 15% to 35% by mass of a structural unit derived from styrene, 4% to 25% by mass of a structural unit derived from acrylonitrile, and 60% to 81% by mass of a structural unit derived from methyl methacrylate, based on 100% by mass of a total content of these structural units, and wherein content ratios of the rubber-reinforced vinyl-based resin, the methacrylic resin, and the α-methyl styrene-based resin are respectively 20% to 55% by mass, 20% to 60% by mass, and 10% to 45% by mass based on 100% by mass of a total of these components.

6. The thermoplastic resin composition according to claim 5, wherein the methacrylic resin consists of 40% to 80% by mass of the polymethyl methacrylate and 20% to 60% by mass of the styrene/acrylonitrile/methyl methacrylate copolymer based on 100% by mass of a total content of the polymethyl methacrylate and the styrene/acrylonitrile/methyl methacrylate copolymer.

7. The thermoplastic resin composition according to claim 5, wherein a content ratio of the structural unit derived from the α-methyl styrene constituting the α-methyl styrene-based resin is 60% by mass or more with respect to a total amount of the structural units constituting the α-methyl styrene-based resin.

8. The thermoplastic resin composition according to claim 5, wherein a content ratio of the rubbery part constituting the rubber-reinforced vinyl-based resin is in a range from 5% to 40% by mass with respect to a whole of the thermoplastic resin composition.

9. A molded article comprising the thermoplastic resin composition according to claim 5.

* * * * *